United States Patent [19]

Hammes

[11] 4,228,122
[45] Oct. 14, 1980

[54] METHOD OF MANUFACTURING ROLLER CHIMES FOR CLOSED HEAD DRUMS

[75] Inventor: Theo Hammes, Cologne, Fed. Rep. of Germany

[73] Assignee: Mauser Kommandit-Gesellschaft, Bruhl, Fed. Rep. of Germany

[21] Appl. No.: 884,397

[22] Filed: Mar. 8, 1978

[51] Int. Cl.² ............................................. B29C 17/07
[52] U.S. Cl. ...................................... 264/534; 425/525
[58] Field of Search ................... 264/89, 94, 96–99, 264/296, 534; 425/525

[56] References Cited

U.S. PATENT DOCUMENTS

| | | |
|---|---|---|
| 3,004,285 | 10/1961 | Hagen . |
| 3,050,773 | 8/1962 | Hagen .................................. 264/98 |
| 3,214,797 | 11/1965 | Ollier et al. . |
| 3,298,514 | 1/1967 | Erickson . |
| 3,342,915 | 9/1967 | Wanderer . |
| 3,804,289 | 4/1974 | Churan . |
| 3,821,344 | 6/1974 | Peters .............................. 264/296 X |
| 3,843,005 | 10/1974 | Uhlig . |
| 3,889,839 | 6/1975 | Simon et al. . |
| 3,912,438 | 10/1975 | Papovani . |
| 3,934,747 | 1/1976 | Needt . |
| 3,938,687 | 2/1976 | Maier et al. ......................... 220/5 R |
| 3,985,257 | 10/1976 | Shaffer et al. . |
| 4,094,432 | 6/1978 | Zilbert . |
| 4,170,623 | 10/1979 | Dubois et al. .................. 425/525 X |

FOREIGN PATENT DOCUMENTS 7600621 5/1976 Fed. Rep. of Germany .

*Primary Examiner*—Jan H. Silbaugh
*Attorney, Agent, or Firm*—Pennie & Edmonds

[57] ABSTRACT

In the production of closed head drums, integral L-shaped roller chimes are formed outwardly from the side walls of the drums. In producing the drums, a thermoplastic parison or tubular member is placed within a mold and is shaped by blowing it outwardly against the mold surfaces. In the blowing operation, an inwardly open channel-shaped part is formed in the tubular member, then by moving one part of the mold relative to another, the channel-shaped part is compressed into the L-shaped chime.

13 Claims, 5 Drawing Figures

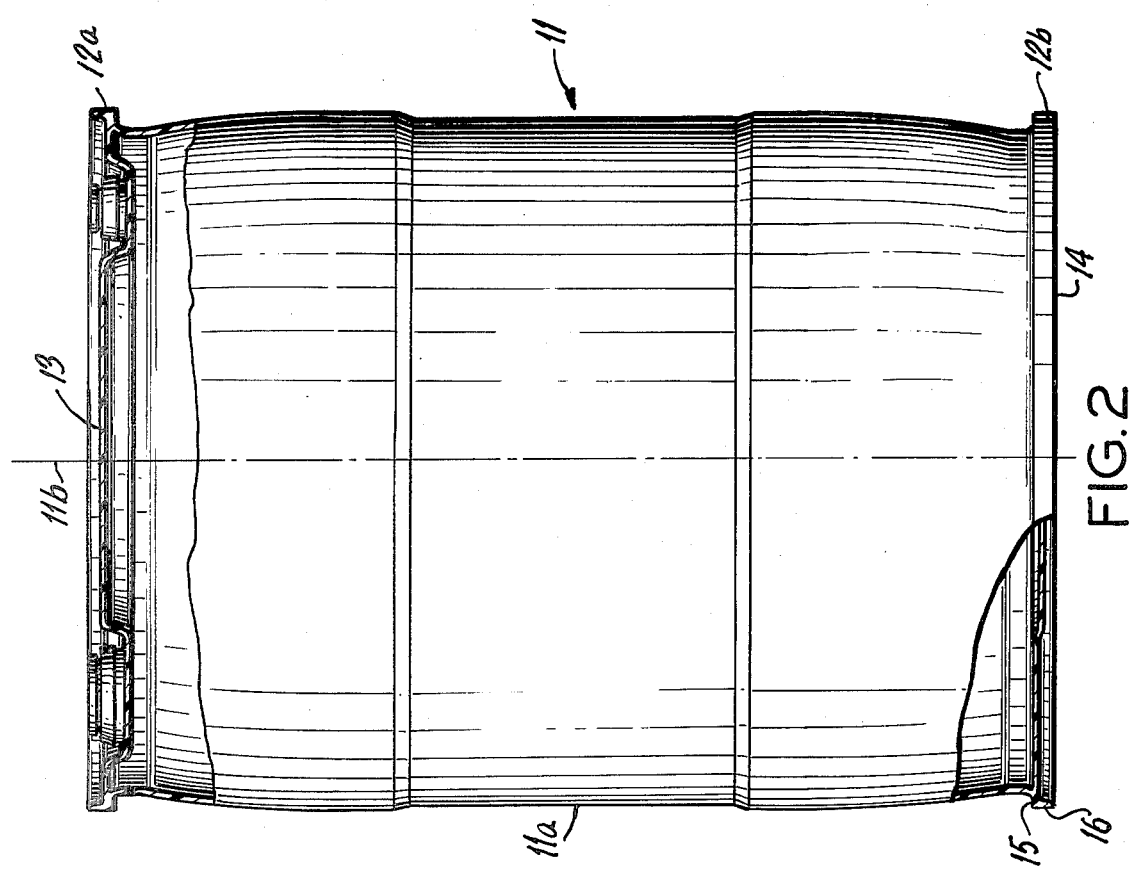
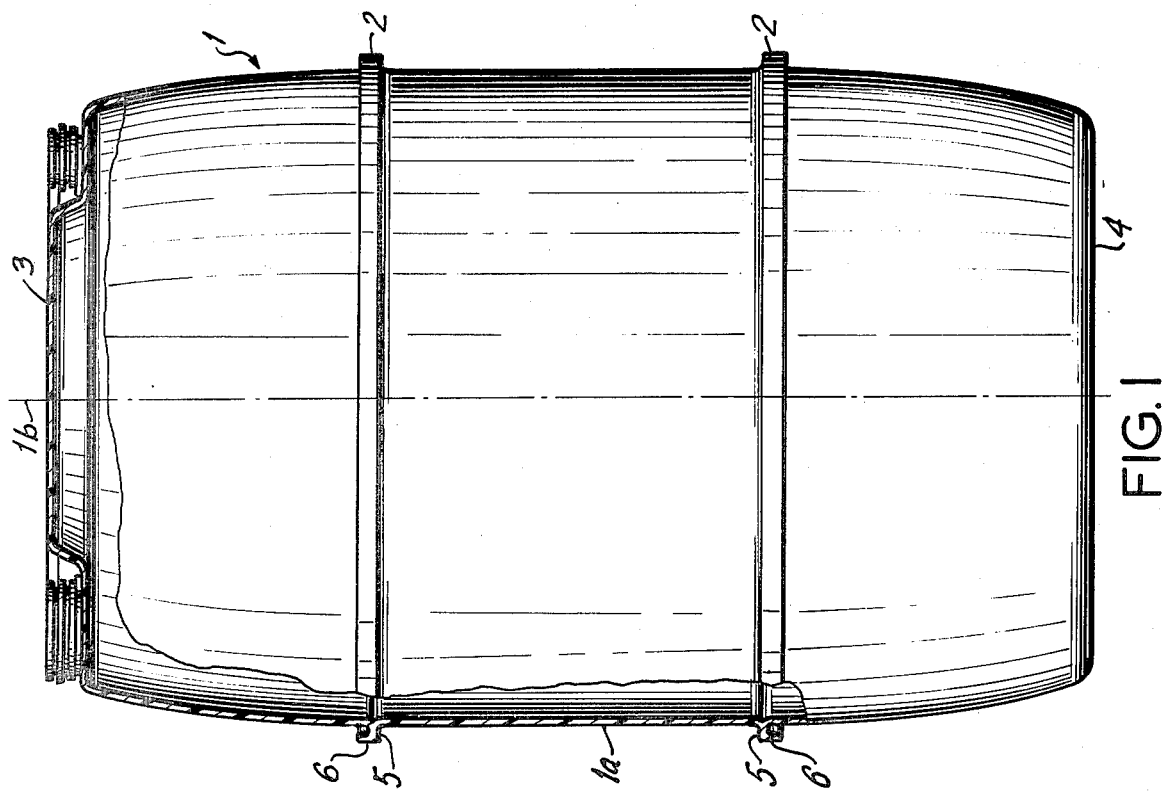

METHOD OF MANUFACTURING ROLLER CHIMES FOR CLOSED HEAD DRUMS

SUMMARY OF THE INVENTION

The present invention is directed to a closed head drum formed of thermoplastic material and blown into shape within a mold and, more specifically, it concerns the formation of roller chimes integral with and extending outwardly from the side wall of the drum body.

In accordance with conventional drum terminology, a chime is an integral part of the drum which extends radially outwardly from its lateral surface while a hoop, which serves the same function as a chime, is a separate part of the drum, that is, it is not formed integrally with the drum body.

In the past prefabricated roller hoops have been inserted into a blowing mold and, upon inflation of an extruded parison or tubular member, a welding action takes place between the roller hoop and the parison which has been expanded to form the drum. One problem with such drums is that the hoop must be welded to the parison or tubular member. To assure the welding action. the blowing mold must be equipped with complicated devices which hold the hoops with separate locking elements. When the main body of the mold is assembled the part holding the hoops must fit into it as an intermediate part to provide a single unit when the mold is completely closed. In the production of open top containers or drums which have a wide neck, it has been known to mount prefabricated head rings made of thermoplastic material for reinforcing the container or drum opening when it is formed. The head ring are positioned in an intermediate mold part positioned centrally below the discharge nozzle of the blowing machine. Accordingly, as the parison moves downwardly it passes through the center of the head ring. When the mold parts are closed, the intermediate part supporting the head ring slides into recesses in the mold parts to form the complete closed mold unit.

When open top drums without head rings or hoops are formed, it has been known to join a prefabricated bottom hoop with the drum body during the blowing operation and, as a result, the hoop rests on a separate lower one-part mold section and is centered relative to the remaining mold parts. It is necessary, however, to close the end of the parison with a special tool as it moves downwardly into the mold. Further, it is also necessary to eliminate or remove any residue of the parison which occurs in the lower closure area. The technology required for closing the parison and removing any waste is complicated and time-consuming. After completing such intermediate operations, the main mold parts are moved together and the lower mold section is lifted together with the bottom hoop so that the entire mold is closed.

From a technical point of view it is cumbersome to produce a hollow body, such as a closed head drum, with specially prefabricated head and bottom chimes by means of a blowing operation. Head and bottom chimes are, however, preferred in drums due to the improved rolling and handling of the drums which is attained, particularly handling by cranes. The provision of such chimes is especially important in plastic drums. Due to changes in form, it is difficult to roll a filled plastic drum over the ground. It is also difficult to roll a drum on its bottom edge when it is held upright but slightly inclined, because of the deformation of the bottom end of the drum. Finally, no suitable means has been provided at the transition from the drum end to its side surfaces for moving the drum along its bottom edge or for rolling the drum or for inserting crane hooks for purposes of lifting and transporting.

To overcome these difficulties it has been attempted to assemble head and bottom metal hoops on a blown plastic drum or hollow body. Such a construction requires cumbersome assembly work and any deformation of the metal hoops becomes a permanent feature of the drum. Further, since there may be as much as a seven-fold difference in the coefficient of expansion for plastic and metal, the hoops mechanically secured on the plastic drum have a tendency to jump off.

Therefore, it is the primary object of the present invention to provide a roller chime formed integrally with the drum body so that prefabricated roller hoops do not have to be inserted into the blowing mold nor is it necessary to attach such hoops to the drum body after it has been formed.

In accordance with the present invention, the thermoplastic parison or tubular member is blown in a mold to form a closed head drum and during this operation an intermediate form of the roller chimes is produced and, after the blowing operation, movable parts of the mold are displaced relative to stationary parts, in the axial direction of the drum body, to complete the chimes. The movable and stationary parts of the mold form recesses in which the intermediate formation of the chimes is effected. Preferably, the chimes are formed at the ends of the drum.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the Drawing:

FIG. 1 is an elevational view, partly in section, of a closed head drum embodying the present invention;

FIG. 2 is an elevational view, partly in section, of another embodiment of a closed head drum incorporating the present invention;

DETAILED DESCRIPTION OF THE INVENTION

Figure 3:
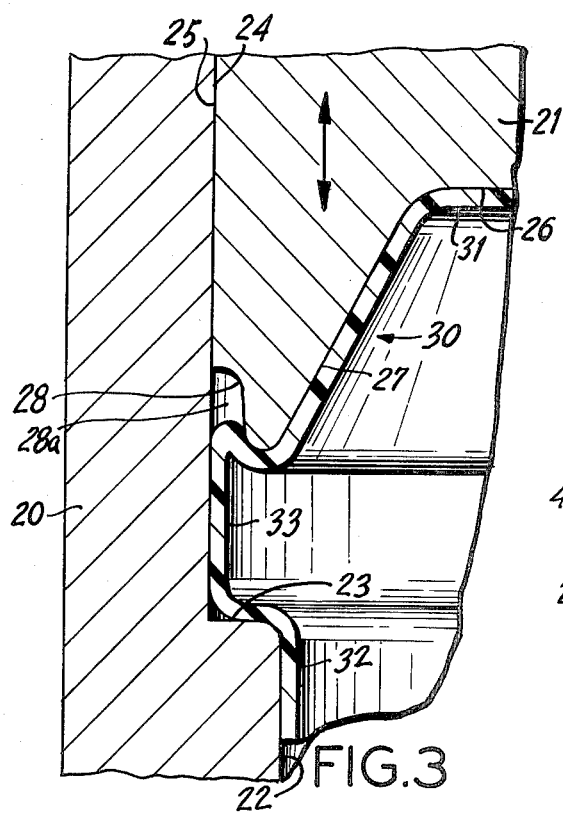
FIG. 3 is a partial cross-sectional view of mold parts used in forming a closed end drum in accordance with the present invention.

In FIG. 1 a closed head drum 1, formed of thermoplastic material, is illustrated having roller chimes 2 located approximately at the third points between the head end 3 and the bottom end 4 of the drum. Each roller chime 2 has an L-shaped cross-section with a first leg 5 extending radially outwardly from the outer lateral surface 1a of the drum and a second leg 6 positioned transversely of and extending from the radially outer end of the first leg 5. The second leg 6 extends approximately parallel to the axis 1b of the drum toward the adjacent end of the drum. In other words, as viewed in FIG. 1, the second leg 6 of the upper roller chime 2 projects toward the head end 3 and, the second leg 6 of the lower roller chime 2 projects toward the bottom end 4 of the drum.

In FIG. 2 a thermoplastic drum 11 is illustrated which is generally similar to the drum 1 shown in FIG. 1, however, its exterior shape is somewhat different and it has one roller chime 12a extending circumferentially about the head end 13 of the drum and another roller chime 12b extending the bottom end 14 of the drum. The roller chimes 12a, 12b have basically the same L-shape as the roller chimes 2 illustrated in FIG. 1. Each of the roller chimes 12a, 12b has a radially outwardly projecting first leg 15 and a second leg 16 extending approximately parallel to the axis 11b of the drum. While in FIG. 1 the roller chimes 2 are formed integrally with the drum body and extend outwardly from the outer surface 1a, in FIG. 2 the roller chimes 12a, 12b are formed at the transition between the lateral surface or body 11a of the drum and the drum ends 13, 14. In FIG. 1, the legs 6 project toward the adjacent ends of the drum while in FIG. 2 the legs 16 extend outwardly from the plane of the drum ends 13, 14.

The drums illustrated in FIGS. 1 and 2 are formed of a thermoplastic material, preferably polypropylene. The drums are produced in a conventional blowing mold, such as illustrated in the U.S. Pat. No. 3,050,773 to Hagen. In forming the drum, a parison or tubular member, not shown, formed of a thermoplastic material is fed into an open mold of the type disclosed in the Hagen patent. After the tubular member is in position, the mold parts are closed and compressed air or another gaseous medium is blown into the interior of the tubular member forcing it outwardly against the interior surfaces of the mold. The thermoplastic material is supplied into the mold under such conditions that, under the action of the compressed air or other medium, it conforms to the interior shape of the mold. An extruded tubular member received directly from the extruder could be used, though other thermoplastic tubular sections could also be employed.

In Hagen various types of hollow containers or products are shown blown into shape within a closed mold which is constructed of various separable parts for the introduction of the tubular member. Such molds are known in the art, accordingly, further description of them is not necessary. Further, in FIG. 4 of the Hagen patent a hollow product is shown being produced similar to the shape of the closed end drum illustrated in FIGS. 1 and 2. It should be noted that the ribs formed radially outwardly from the blown product in FIG. 4 of Hagen do not afford the advantages provided by the L-shaped roller chimes shown herein.

Figure 4:
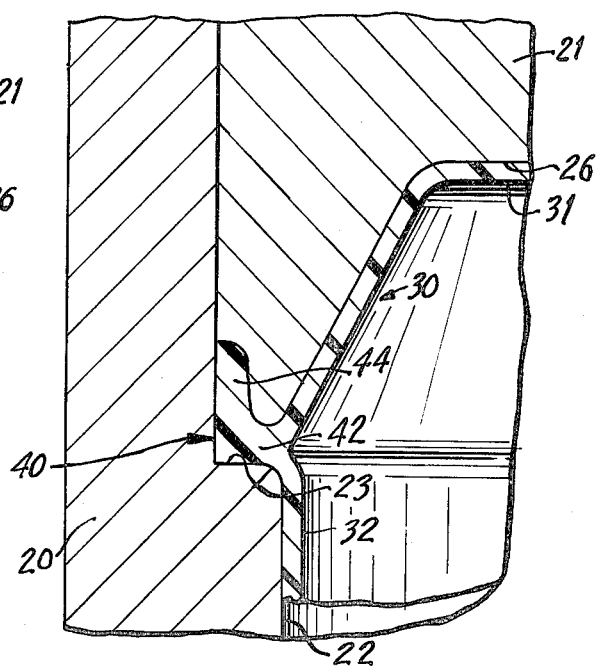
FIG. 4 is a view similar to FIG. 3 with the mold parts displaced relative to one another from the position shown in FIG. 3.

FIGS. 3 and 4 illustrate the parts of the mold used in forming the roller chimes of the present invention. As in the Hagen patent, the mold parts can be moved apart from one another to provide the introduction of the thermoplastic tubular member employed in producing the closed end of the drum.

In FIGS. 3 and 4 the mold consists in part of a side mold part 20 and end mold part 21. When the mold parts have been assembled to form the closed mold preparatory to the blowing step, the side mold part 20 is retained in a stationary position while the end mold part 21 is movable relative to the side mold part in the direction of the arrows shown in FIG. 3. It can be appreciated that, while only a portion of the mold structure which forms the head end of the drum is shown, a similar arrangement of the mold would be provided at its lower end.

The side mold part 20 includes a first inner surface 22 which forms the outer lateral or side wall surfaces of the drum being produced. At the upper end of the first surface 22, a shoulder or ledge 23 extends radially outwardly. Extending upwardly from the radially outer edge of the shoulder 23 is a second inner surface 24.

The end part of the mold fits within the second surface 24 and has a circumferentially extending surface 25 disposed in a sliding contact with the second surface 24. The end part 21 has inwardly directed surfaces 26 and 27 which shape the outer end surface of the drum. At its lower end, the surface 25 has a radially inwardly directed surface 28 which joins with the lower end of the surface 27.

A part of the tubular section 30 used in forming the closed end drum is shown in FIGS. 3 and 4 after it has been blown outwardly against the inwardly directed surfaces of the mold.

FIG. 3 shows an intermediate position of the mold following the blowing operation where the tubular member 30 has been forced outwardly to conform to the shape of the interior of the mold. In this intermediate position, the tubular member 30 has been shaped to provide a drum end 31 and a drum side wall 32 with an intermediate section 33 interconnecting the end and side wall. The drum end 31 is dish-shaped with a flat central part and an annular part circling the central part and extending at an acute angle to and between the central part and the cylindrically-shaped side wall 32. The end part 21 of the mold is spaced from the shoulder 23 on the side part 22 so that the intermediate part 33 of the tubular section is channel-shaped with the opening to the channel or recess facing into the interior of the mold. At this point in the production of the drum, the tubular member 30 has been blown outwardly against the lower end of the second surface 24, however, the tubular member has entered into only the lower end of the recess 28a defined by the second surface 24 and the surface 28. It is this intermediate part 33 which forms the roller chime for the drum.

With the tubular member blown outwardly and the intermediate part 33 formed, the end part 21 of the mold is moved relative to the side part 20 so that its circumferential surface 25 rides downwardly along the second surface 24. As the end part 21 moves downwardly the intermediate part 33 of the tubular member is compressed and flows into the recess 28a between the surface 28 on the end part and the second surface 24 on the side part of the mold. This flow of the thermoplastic material can be noted in FIG. 4. The end part 21 ceases its downward movement with the lower end of the surfaces 27, 28 spaced upwardly from the shoulder 23. The thermoplastic material which flows into the recess 28a is welded together and, at the completion of the downward movement of the end part 21, a roller chime 40 has been formed at the transition between the end 31 and the side wall 32 of the drum. The integral roller chime 40, as with the roller chimes shown in FIGS. 1 and 2, consists of a radially outwardly extending first leg 42 and a second leg 44 projecting from the outer end of the first leg 42 in the direction toward the adjacent end of the drum. A companion roller chime would be formed at the lower end of the drum and its second leg would also be directed toward the adjacent bottom end of the drum. In this arrangement of the mold parts, the second legs 44 of the roller chimes 40 extend oppositely away from one another. This is a preferred arrangement. However, it would be possible with a different construction of the mold parts to provide the second legs projecting toward one another and away from the adjacent drum ends.

Due to the amount of thermoplastic material provided in the intermediate part 33, the roller chime 40 has an increased thickness as compared to the wall thickness of the drum. Further, in FIGS. 3 and 4 a preferred location of the roller chimes is illustrated, however, the roller chimes, as displayed in FIGS. 1 and 2, can be located at positions intermediate the drum ends or in the plane of the end surface of the drum.

Figure 5:
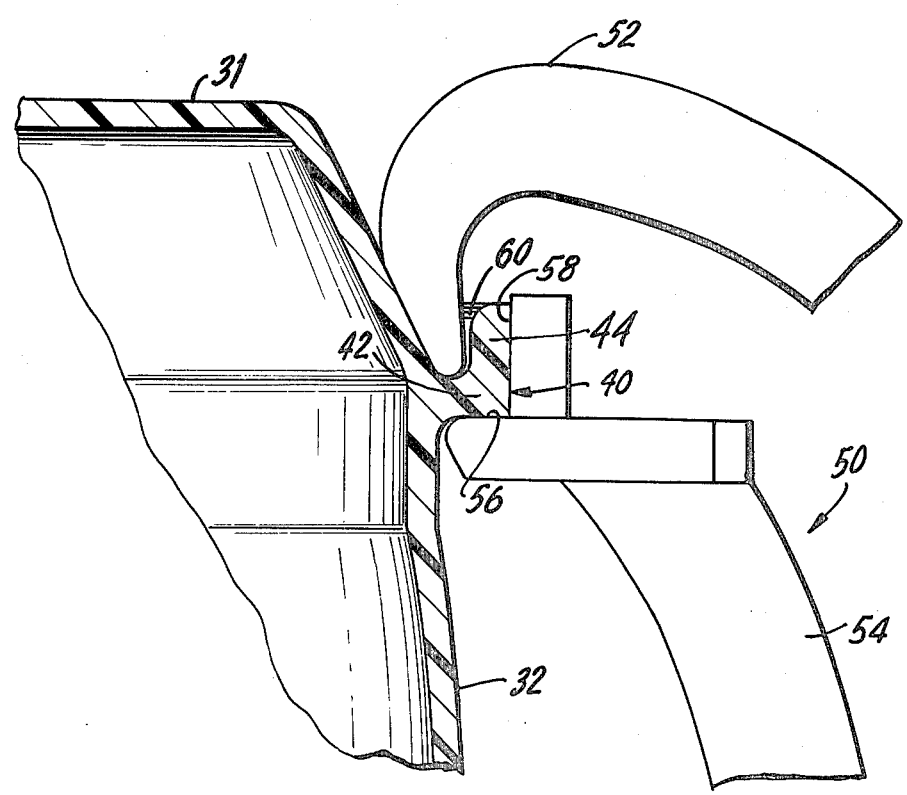
FIG. 5 is a partial cross-sectional view illustrating a lifting device engaging one of the roller chimes on a closed head drum formed in accordance with the present invention.

In FIG. 5 a portion of a drum with a roller chime 40 as illustrated in FIG. 4 is held by a tool 50 for lifting and transporting the drums. The tool 50 includes arms 52 and 54. The arm 54 has right-angle support surfaces 56, 58 at its free end and the surface 56 bears against the downwardly facing surface of the first leg 42 while the surface 58 bears against the radially outer and upwardly extending surface of the second leg 44. As shown, the load is transferred from the drum through the first leg 42 to the arm 54. The other arm 52 fits downwardly into the recess 60 created between the inwardly facing surface of the second leg 44 and the adjacent outwardly facing surface of the drum end 31. The arm 52 holds the roller chime 40 against the right angle support surfaces 56, 58 so that the drum can be lifted and transported in a reliable manner. The L-shaped configuration of the roller chime 40 with the orientation of its second leg directed upwardly is particularly advantageous for use with the lifting and transporting means shown in FIG. 5. Furthermore, the increased thickness of the roller chime 40 as compared to the wall thickness of the drum assures the integrity of the drum during lifting operation. Moreover, the increased thickness dimension of the roller chime permits the drum to be rolled by means of the chimes without any difficulties.

While specific embodiments of the invention have been shown and described in detail to illustrate the application of the inventive principles, it will be understood that the invention may be embodied otherwise without departing from such principles.

What is claimed is:

1. The method of manufacturing a closed hollow member such as a closed head drum, from a thermoplastic material having spaced end walls and a side wall extending between the end walls, comprising the steps of:
   (a) forming a tubular section of thermoplastic material;
   (b) closing the ends of the tubular section;
   (c) applying a gaseous medium to the interior of the closed tubular section within a mold to blow mold the thermoplastic material outwardly into a hollow shaped member with end walls and a side wall having a projecting annular channel-shaped part with the opening thereto directed toward the interior of the hollow member and the radially outer wall thereof projecting outwardly from the remainder of the side wall of the hollow member; and
   (d) pressing the channel-shaped part together and simultaneously squeezing a portion of the thermoplastic material defining the channel-shaped part through a restricted opening having a dimension less than the thickness of the portion of the channel-shaped part to be squeezed therethrough to cause the plastic material to flow through said opening into an annular mold recess and form a molded annular chime disposed at least partially radially outwardly from and integrally molded to the side wall of the hollow member.

2. The method according to claim 1 wherein:
   (a) the channel-shaped part is formed adjacent at least one end of the hollow member; and
   (b) the channel-shaped part is pressed and squeezed to an L-shaped chime having a first leg extending radially outwardly from the portion of the wall of the hollow member that extends between the chime and the adjacent one end of the hollow member and a second leg extending in a direction toward the adjacent end of the hollow member and in spaced relation outwardly from the portion of the wall of the hollow member that extends between the chime and said adjacent end.

3. The method according to claim 2 wherein:
   (a) the second leg of the L-shaped chime is formed at the outer radial end of the first leg in radially spaced relation to the side wall of the hollow member.

4. The method according to claim 2 wherein:
   (a) the portion of the wall of the hollow member that extends between the chime and the adjacent end of the hollow member is formed at a radially inwardly directed acute angle relative to the side wall of the hollow member to form a spacing between this portion of the wall and the second leg of the L-shaped chime.

5. The method according to claim 2 wherein:
   (a) the hollow shaped member, including the chime-shaped part, is blow molded to a predetermined wall thickness;
   (b) the first leg of the L-shaped chime is formed to a thickness greater than twice the wall thickness of the hollow member; and
   (c) the portion of the channel-shaped part of the hollow member which is squeezed through said restricted opening to form the second leg of the L-shaped chime is reduced to a thickness less than twice the wall thickness of the hollow member.

6. The method according to claim 2 wherein:
   (a) the hollow shaped member, including the channel-shaped part, is blow molded to a predetermined wall thickness;
   (b) the channel-shaped part is pressed together to form a multiple wall thickness at the location of the restricted opening; and
   (c) the multiple wall thickness is squeezed to a thickness less than said multiple wall thickness upon flowing through said restricted opening.

7. The method according to claim 6 wherein:
   (a) at least a portion of the multiple wall thickness of the channel-shaped part which is not squeezed through said restricted opening is pressed into the first leg of the L-shaped chime as it is being formed.

8. A method of manufacturing a closed hollow member, such as a closed head drum, formed of a thermoplastic material and having spaced end walls and at least one side wall extending between the end walls and with roller chimes extending radially outwardly from the side wall, comprising forming an openable and closeable hollow mold having spaced end surfaces and at least a side surface extending between the end surfaces, the end surfaces and side surface providing chime forming surfaces with a portion of the chime forming surfaces being movable in the direction between the end surfaces of the mold relative to the remaining portion of the chime forming surfaces of the mold and the spaced end surfaces and side surface defining a closed hollow space, positioning a tubular section of thermoplastic material within the mold in the opened state, closing the mold, applying a gaseous medium through the mold into the interior of the tubular section and blowing the thermoplastic material tubular section outwardly against the side and end surfaces of the closed mold and forming the end and side walls of the hollow member, and forming an annular, channel-shaped part in the side wall of the tubular section within the chime forming surfaces of the mold with the opening to the channel-shaped part directed toward the interior of the hollow member and the radially outer wall of the channel-shaped part projecting outwardly from the remainder of the side wall of the hollow member, wherein the improvement comprising the steps of:

(a) forming an annular recess between the relatively movable chime forming surfaces of the mold,
  (1) said recess having an opening communicating with the channel-shaped part of the side wall of the tubular section of thermoplastic material;
(b) displacing the movable chime forming surface relative to the remaining chime forming surfaces to press the channel-shaped part of thermoplastic material therebetween to at least begin formation of a first leg of an L-shaped chime extending radially outwardly from the side wall of the hollow member; and
(c) squeezing a portion of the wall of thermoplastic material forming the channel-shaped part into the recess to form a second leg of the chime within the recess,
  (1) the opening in said recess having a dimension less than the thickness of the portion of the wall of the channel-shaped part squeezed thereinto, and
  (2) the second leg formed within said recess extending transversely from the outer end of the first leg generally in the same direction as the side wall of the hollow member and radially outwardly thereof.

9. The method according to claim 8 wherein:
(a) the recess is formed with an opening less than twice the thickness of the wall of the channel-shaped part of the tubular section; and
(b) the wall of the channel-shaped part is folded over upon itself to a multiple thickness and at least a portion of this multiple thickness is squeezed through the opening and into said recess to cause the plastic material to flow and form the second leg of the L-shaped chime.

10. The method according to claim 9 wherein:
(a) the recess is formed with a width less than twice the thickness of the wall of the channel-shaped part of the tubular section whereby the second leg of the L-shaped chime is formed with a thickness less than twice the wall thickness of the tubular section.

11. The method according to any one of claims 8–10 wherein:
(a) the movable chime forming surface of the mold is moved toward the remaining chime forming surfaces to define a spacing immediately adjacent the opening into said recess in which spacing the first leg of the L-shaped chime is formed, said spacing being greater than twice the wall thickness of the channel-shaped part of the tubular section to form the first leg at a thickness greater than twice said wall thickness.

12. The method according to any one of claims 8–10 wherein:
(a) the movable chime forming surface of the mold is moved toward the remaining chime forming surfaces to define a spacing immediately adjacent the opening into said recess in which spacing the first leg of the L-shaped chime is formed, said spacing being greater than twice the wall thickness of the channel-shaped part of the tubular section to form the first leg at a thickness greater than twice said wall thickness; and
(b) at least a portion of the material of the channel-shaped part which is not squeezed through said restricted opening is pressed into the spacing immediately adjacent the opening to form, with the remainder of the channel-shaped part, the first leg of the L-shaped chime.

13. A method of manufacturing a closed hollow member, such as a closed head drum formed of a thermoplastic material and having spaced end walls and at least one side wall extending between the end walls and with roller chimes extending radially outwardly from the side wall, comprising forming an openable and closeable hollow mold having spaced end surfaces and at least a side surface extending between the end surfaces, the end surfaces and side surface providing chime forming surfaces with a portion of the chime forming surfaces being movable in the direction between the end surfaces of the mold relative to the remaining portion of the chime forming surfaces of the mold and the spaced end surfaces and side surface defining a closed hollow space, positioning a tubular section of thermoplastic material within the mold in the opened state, closing the mold, applying a gaseous medium through the mold into the interior of the tubular section and blowing the thermoplastic material tubular section outwardly against the side and end surfaces of the closed mold and forming the end and side walls of the hollow member, and forming an annular, channel-shaped part in the side wall of the tubular section within the chime forming surfaces of the mold with the opening to the channel-shaped part directed toward the interior of the hollow member and the radially outer wall of the channel-shaped part projecting outwardly from the remainder of the side wall of the hollow member, wherein the improvement comprising the steps of:

(a) forming an annular recess between the relatively movable chime forming surfaces of the mold,
  (1) said recess having an opening communicating with the channel-shaped part of the side wall of the tubular section of thermoplastic material;
(b) displacing the movable chime forming surface relative to the remaining chime forming surfaces to press the channel-shaped part of thermoplastic material therebetween to at least begin formation of a first leg of an L-shaped chime extending radially outwardly from the side wall of the hollow member; and
(c) squeezing a portion of the wall of thermoplastic material forming the channel-shaped part into the recess to form a second leg of the chime within the recess, (1) the opening into said recess being restricted relative to the thickness of the material to be squeezed therein to cause the plastic material to flow through said opening and into the recess, and (2) the second leg formed within said recess extending transversely from the outer end of the first leg generally in the same direction as the side wall of the hollow member and radially outwardly thereof.

* * * * *